(12) United States Patent  
Harada

(10) Patent No.: US 8,334,854 B2  
(45) Date of Patent: *Dec. 18, 2012

(54) DISPLAY DEVICE AND DISPLAY METHOD

(75) Inventor: Tsutomu Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 12/685,518

(22) Filed: Jan. 11, 2010

(65) Prior Publication Data

US 2010/0103151 A1 Apr. 29, 2010

Related U.S. Application Data

(63) Continuation of application No. 11/477,202, filed on Jun. 27, 2006, now Pat. No. 7,671,848.

(30) Foreign Application Priority Data

Jul. 12, 2005 (JP) ................................. 2005-203259

(51) Int. Cl.
*G06F 3/042* (2006.01)
(52) U.S. Cl. ........................ 345/175; 345/156; 345/173
(58) Field of Classification Search ................. 345/156, 345/173, 175
See application file for complete search history.

(56) References Cited

U.S. PATENT DOCUMENTS

| 4,689,446 | A | 8/1987 | Hasegawa et al. |
| 7,800,594 | B2 * | 9/2010 | Nakamura et al. ............ 345/175 |
| 2002/0079512 | A1 | 6/2002 | Yamazaki et al. |

FOREIGN PATENT DOCUMENTS

| JP | 06-230145 | 8/1994 |
| JP | 2003-337657 | 11/2003 |
| JP | 2004-318819 | 11/2004 |
| JP | 2004-127272 | 4/2005 |

* cited by examiner

*Primary Examiner* — Amare Mengistu
*Assistant Examiner* — Koosha Sharifi-Tafreshi
(74) *Attorney, Agent, or Firm* — Robert J. Depke; Rockey, Depke & Lyons, LLC

(57) ABSTRACT

The present invention includes a display device for displaying an image and receiving light simultaneously or alternately. The display device includes: a plurality of display elements for displaying the image on a display surface of the display device by emitting light; a plurality of light receiving elements for receiving light incident on the display surface formed by the display elements; a storing unit for storing, as an initial value, a difference between two amounts of light received by the light receiving elements; and a detecting unit for detecting a state of contact with or proximity to the display surface and subtracting the initial value stored by the storing unit from a difference between the two detected amounts of received light.

6 Claims, 11 Drawing Sheets

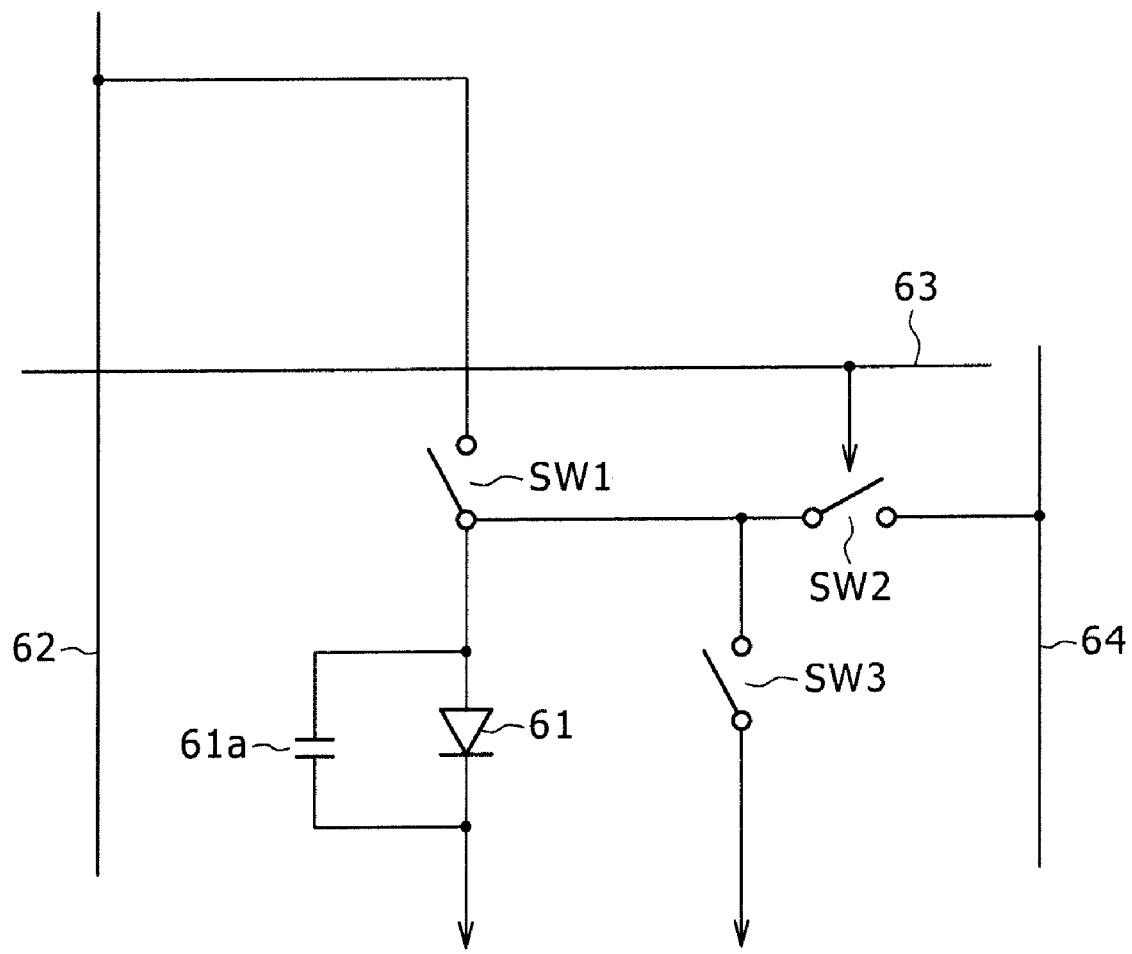

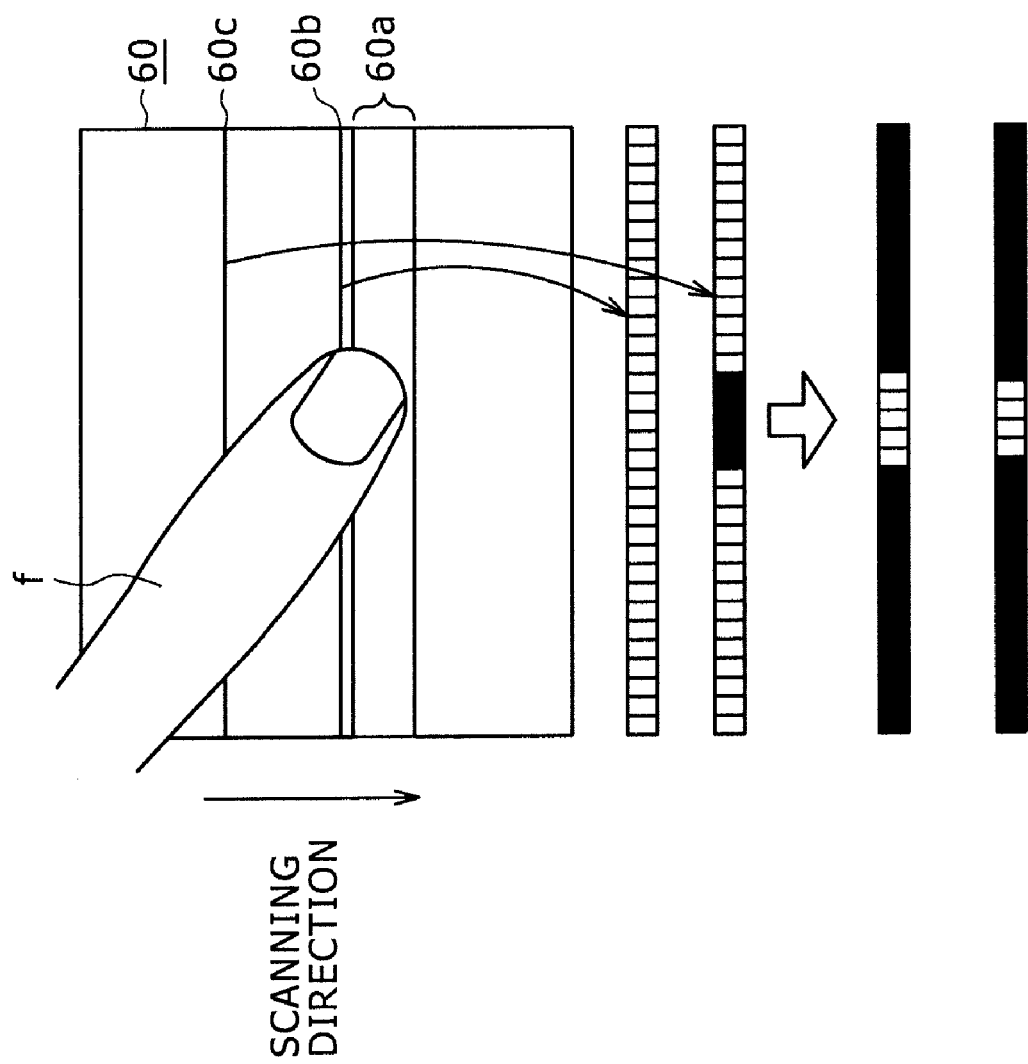

DISPLAY DEVICE AND DISPLAY METHOD

CROSS REFERENCES TO RELATED APPLICATIONS

The subject matter of application Ser. No. 11/477,202, is incorporated herein by reference. The present application is a Continuation of U.S. Ser. No. 11/477,202, filed Jun. 27, 2006, which claims priority to Japanese Patent Application JP 2005-203259 filed in the Japanese Patent Office on Jul. 12, 2005, the entire contents of which being incorporated herein by reference.

BACKGROUND OF THE INVENTION

1. Field of the Invention

The present invention relates to a display device and a display method suitable for application to a liquid crystal display and an organic EL (electroluminescence) display, for example, and particularly to display techniques that enable light reception in parallel with light emission.

2. Description of the Related Art

In related art, when a touch panel for allowing an operation by touching a display screen of a display device such as a television receiver or the like is formed on the display screen, the tough panel separate from the display device is put over the display screen.

As a constitution using a separate touch panel, there is for example a constitution having a thin transparent input detecting device affixed on a screen. This is a touch sensor using a conductive film. There are for example pressure-sensitive type devices detecting pressure, capacitance type devices changed by contact with a human body, and the like. In addition, there are devices referred to as an electromagnetic induction type, which allows a position to be input using a special pen. These devices have a structure in which the surface of a display panel has another special panel for position detection placed thereon.

While touch detection principles for these devices using the detection panel placed on the display panel are easy, a decrease in display quality inevitably occurs because some member is placed on the display panel. In addition, since a detection method is mainly a method of detecting a capacitance change, it is difficult to detect inputs at two or more positions simultaneously.

Touch panel systems in which no panel is added on the surface include an optical type. A combination of a light emitting element (light emitting diode or the like) and a phototransistor is arranged on an upper, a lower, a left and a right side of a panel. A position is detected on the basis of light blocked by a finger or the like. Such an optical type does not cause a decrease in display quality, but is not suitable for portable devices because of the large scale of the devices located around the periphery of the display device.

In order to eliminate the inconveniences of these touch panels in related art, devices have recently been proposed in which the screen of the display devices functions as a touch panel as it is without a separate touch panel being provided. Japanese Patent Laid-Open No. 2004-127272 (FIG. 5) discloses such a display device that performs light emission and light reception in parallel.

An example of such a display device that performs light emission and light reception in parallel is configured such that for example display (light emission) of light emitting elements for image display, which elements are arranged on a display surface, is made intermittently, a charge corresponding to received light is accumulated in the light emitting elements themselves in periods when the light emission is stopped, and the accumulated charge is read. As a display device that makes such a configuration possible, there is for example an organic EL display. In addition, it is proposed that when display elements themselves do not have a function of receiving light (accumulating charge) as in the case of liquid crystal displays, light receiving elements are arranged adjacent to the display elements and light is received by the light receiving elements in periods when display (light emission) is stopped.

SUMMARY OF THE INVENTION

When this type of display device that emits light and receives light simultaneously is formed, the state of a received light signal is varied greatly at times of light reception due to effects of extraneous light. Specifically, supposing that touching of a display screen with a finger or the like is to be detected, for example, light receiving conditions differ greatly between a state in which received light is detected within a dark room and a state in which received light is detected outside in bright daylight. It is therefore difficult to detect contact with the surface of the display device or the like under uniform light receiving conditions.

Hence, when the display device is applied to a device usable both outside and inside, as in a case where the display device is applied to the display panel of a portable electronic device, for example, some measure to deal with changes in intensity of extraneous light is required. However, it is difficult to take such a measure easily in an already proposed display device that emits light and receives light simultaneously.

In addition, noise is caused by an internal configuration of a light emitting part of the display device (for example noise caused by a backlight configuration of a liquid crystal display device). Effects of the noise make it difficult to detect a contact position or a proximity position.

The present invention has been made in view of such points. It is desirable to easily eliminate effects of extraneous light and noise when emitting light and receiving light simultaneously.

According to a first embodiment of the present invention, there is provided a display device for displaying an image and receiving light simultaneously or alternately, the display device including: a plurality of display elements for displaying the image on a display surface of the display device by emitting light; a plurality of light receiving elements for receiving light incident on the display surface formed by the display elements; a storing unit for storing, as an initial value, a difference between two amounts of light received by the light receiving elements when the display elements emit light and when the display elements do not emit light in a state of nothing being in contact with or in proximity to the display surface; and a detecting unit for detecting a state of contact with or proximity to the display surface by detecting an amount of light received by the light receiving elements when the display elements emit light and detecting an amount of light received by the light receiving elements when the display elements do not emit light, and subtracting the initial value stored by the storing unit from a difference between the two detected amounts of received light.

According to a second embodiment of the present invention, there is provided a display method for displaying an image on a display surface and receiving light simultaneously or alternately, the display method including the steps of: displaying the image on the display surface on a basis of light emission for display; performing light reception for receiving light incident on the display surface, and as the light reception, performing two light receptions in a state in which the light emission for display in the step of displaying is performed and a state in which the light emission for display is not performed; storing, as an initial value, a difference between amounts of light in the two light receptions in a state of nothing being in contact with or in proximity to the display surface; and detecting a difference value between amounts of light in the two light receptions to detect a state of contact with or proximity to the display surface, and detecting a state of contact with or proximity to the display surface by subtracting the initial value stored in the step of storing from the detected difference value.

Thus, for example, an amount of received light detected by an element at a position of contact with the display surface in a state of elements emitting light and an image being displayed on the display surface is a substantially constant amount of received light irrespective of presence or absence of extraneous light even when the extraneous light is present because an object itself in contact with the display surface blocks the extraneous light. Amounts of received light detected by elements at other positions are changed from the constant amount of received light.

By subtracting the difference between the amount of received light in the light emitting state and the amount of received light in the non-light-emitting state which difference is stored as the initial value from the difference between the two amounts of received light, it is possible to eliminate effects of internal reflection in the display device, and determine contact with a corresponding position. Similar determination can be made for a state of proximity to the display surface.

According to the present invention, a state of contact with (or proximity to) a corresponding position can be determined on the basis of the difference between the two amounts of received light, and effects of internal reflection in the display device are eliminated by subtracting the stored initial value. It is therefore possible to make excellent contact or proximity determination unaffected by a use environment and the internal configuration of the device, with effects of extraneous light and effects inside the display device being eliminated.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a connection diagram showing an example of a pixel configuration according to the second embodiment of the present invention; and FIGS. 14A, 14B, 14C, 14D, and 14E are explanatory diagrams showing an example of drive timing according to the second embodiment of the present invention.

DETAILED DESCRIPTION OF THE PREFERRED EMBODIMENTS

A first embodiment of the present invention will hereinafter be described with reference to FIGS. 1 to 11.

In this example, the present invention is applied to a display device formed as a liquid crystal display. A light receiving element is disposed adjacent to each light emitting element forming the liquid crystal display so that light emission (display) and light reception (reading) can be performed in parallel with each other. The display in this example that can perform the light emission and the light reception in parallel with each other will be referred to as an I/O display because the display can perform image input (light reception) and image output (display) simultaneously. In addition, as will be described later, the I/O display in this example can also detect not only an object in contact with a screen but also an object adjacent to the screen. Therefore contact detection in the following description includes proximity detection unless otherwise specified.

Figure 1:
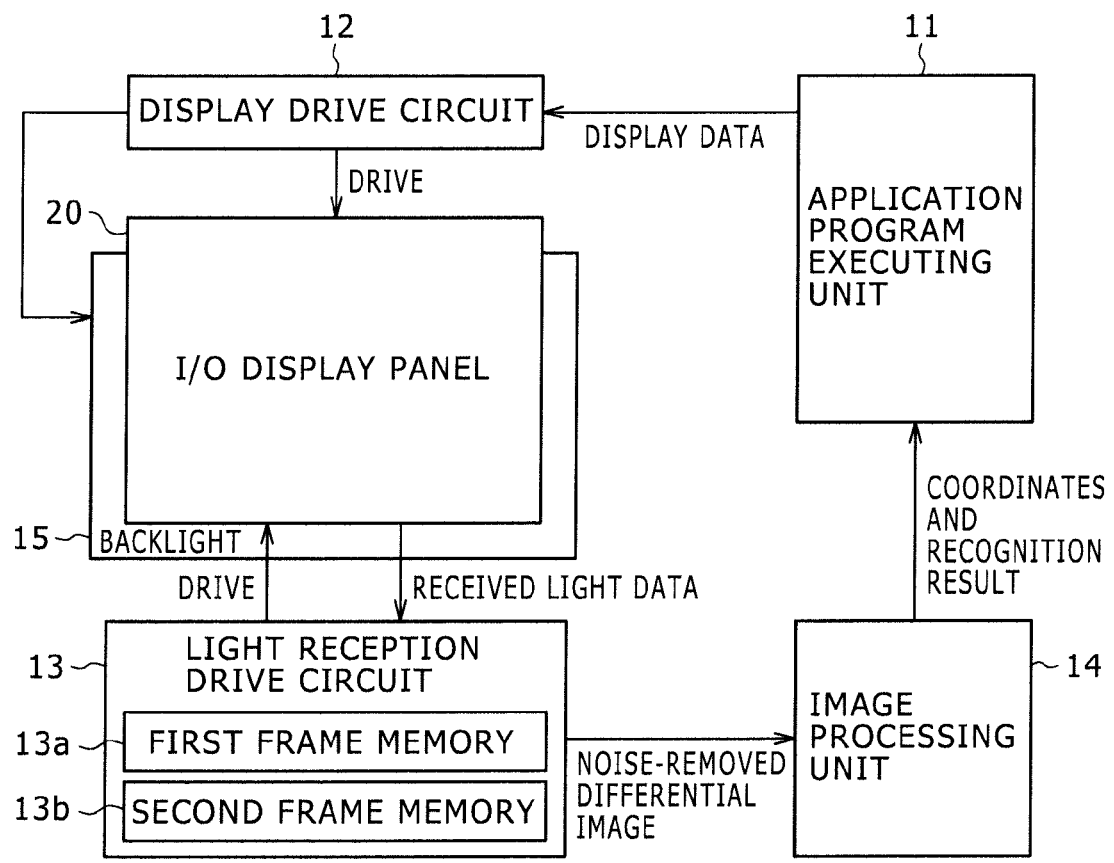
FIG. 1 is a block diagram showing an example of configuration of a display device according to a first embodiment of the present invention.

FIG. 1 is a block diagram showing an example of configuration of the display device in the present example. An application program executing unit 11 performs a process for displaying an image corresponding to an application being executed by the application program executing unit 11. In addition, the application program executing unit 11 detects a contact with a display panel, and performs a process corresponding to a contacted display part, for example. An instruction to display an image is supplied from the application program executing unit 11 to a display drive circuit 12 to perform driving for displaying the image on the I/O display panel 20.

The I/O display panel 20 is formed as a liquid crystal display. The I/O display panel 20 is a display having transparent electrodes on a transparent substrate such as a glass substrate or the like, and a plurality of pixels (display elements) formed in the form of a matrix in a display area (sensor area) 21 (see FIG. 2). A backlight 15 is disposed on a back surface of the I/O display panel 20. The backlight 15 in the present example uses an array of a plurality of light emitting diodes, for example, and the on/off control of the backlight can be performed at a relatively high speed. The on/off control of the backlight is performed in such a manner as to be interlocked with display driving by the display drive circuit 12.

The I/O display panel 20 has a plurality of light receiving elements arranged separately from the display elements. Specifically, for example, light receiving elements are arranged in the form of a matrix in such a manner as to adjoin the respective display elements in the display area (sensor area) 21. A signal charge accumulated in correspondence with an amount of light received by the light receiving elements is read by driving from a light reception drive circuit 13. The light reception drive circuit 13 has a first frame memory 13$a$ and a second frame memory 13$b$ therewithin for use in a determination process necessary at a time of reading a light reception signal as later described. An initial value for determination is stored in the memory 13$b$ of the two frame memories 13$a$ and 13$b$ in advance at a time of manufacturing the display device, for example.

The light reception signal (differential image signal to be described later) read and determined by the light reception drive circuit 13 is sent to an image processing unit 14 to determine a contact state or the like as an image and, as occasion arises, determine a coordinate position of a contact center or the like. A result of the determination (coordinate data, a recognition result and the like) is sent to the application program executing unit 11. The application program executing unit 11 performs a process according to an application being executed. For example, the application program executing unit 11 performs a process of displaying a point, an area or the like where contact is detected in a displayed image.

Figure 2:
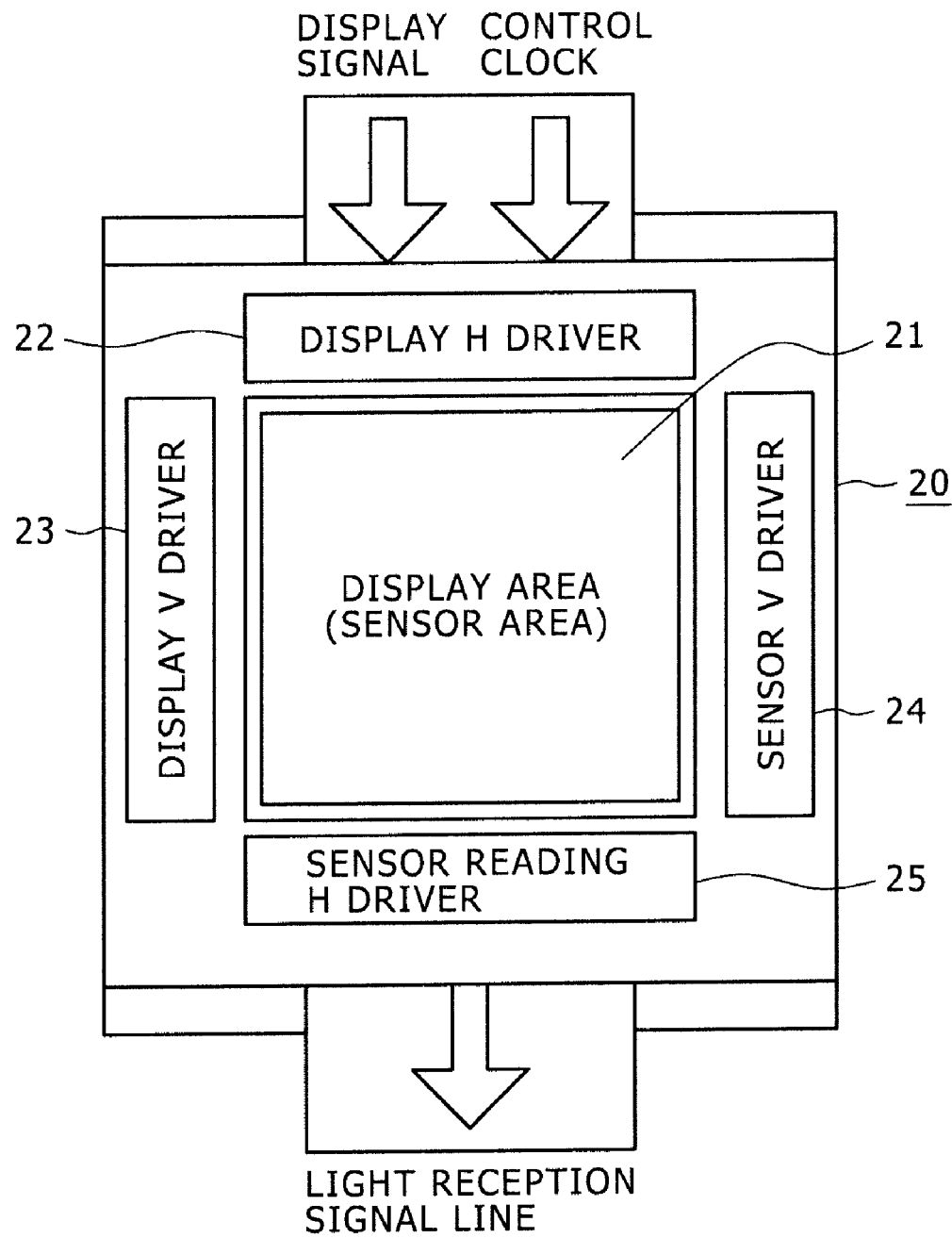
FIG. 2 is a block diagram showing an example of a display panel according to the first embodiment of the present invention.

An example of arrangement of drivers in the I/O display panel 20 in the present example will next be described with reference to FIG. 2. The I/O display panel 20 having the transparent display area (sensor area) 21 at a center thereof has a display horizontal driver 22, a display vertical driver 23, a sensor horizontal driver 24, and a sensor vertical driver 25 arranged at four sides of edges of the display area 21, as shown in FIG. 2. The display horizontal driver 22 and the display vertical driver 23 are supplied with a display signal and a control clock as data for display. The display horizontal driver 22 and the display vertical driver 23 drive the display elements arranged in the form of a matrix in the display area 21. The sensor horizontal driver 24 and the sensor vertical driver 25 are supplied with a clock for reading. The sensor horizontal driver 24 and the sensor vertical driver 25 supply a light reception signal read in synchronism with the clock to the light reception drive circuit 13 via a light reception signal line.

Figure 3:
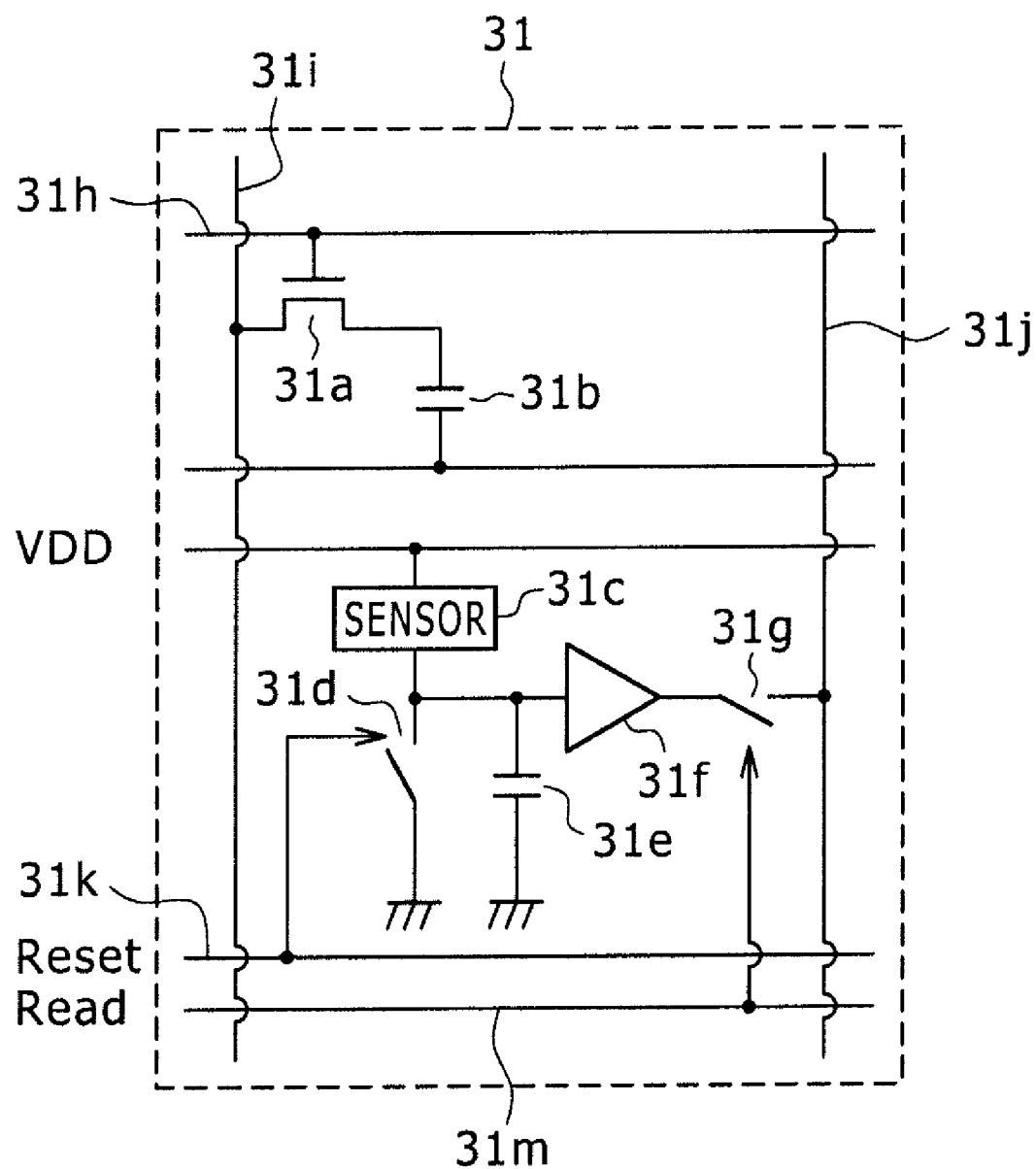
FIG. 3 is a connection diagram showing an example of a pixel configuration according to the first embodiment of the present invention.

FIG. 3 is a diagram showing a constitution of one of pixels arranged in the display area 21. The constitution for display of one pixel 31 in this case has a gate electrode 31$h$ disposed in a horizontal direction, a drain electrode 31$i$ disposed in a vertical direction, and a switching element 31$a$ disposed at an intersection of the two electrodes, the switching element 31$a$ being connected to a pixel electrode 31$b$. The on/off control of the switching element 31$a$ is performed by a signal obtained through the gate electrode 31$h$. A display state at the pixel electrode 31$b$ is set by a signal supplied through the drain electrode 31$i$.

A light receiving sensor (light receiving element) 31$c$ is disposed in the vicinity of the pixel electrode 31$b$. The light receiving sensor (light receiving element) 31$c$ is supplied with a power supply voltage VDD. The light receiving sensor (light receiving element) 31$c$ is connected with a reset switch 31$d$ and a capacitor 31$e$. The light receiving sensor (light receiving element) 31$c$ accumulates a charge corresponding to an amount of received light by the capacitor 31$e$ after being reset by the reset switch 31$d$. A voltage proportional to the accumulated charge is supplied to a signal outputting electrode 31$j$ via a buffer amplifier 31$f$ in timing in which a reading switch 31$g$ is turned on, and then output to an outside. The turning on/off of the reset switch 31$d$ is controlled by a signal obtained by a reset electrode 31$k$. The turning on/off of the reading switch 31$g$ is controlled by a signal obtained by a reading control electrode 31$m$.

Figure 4:
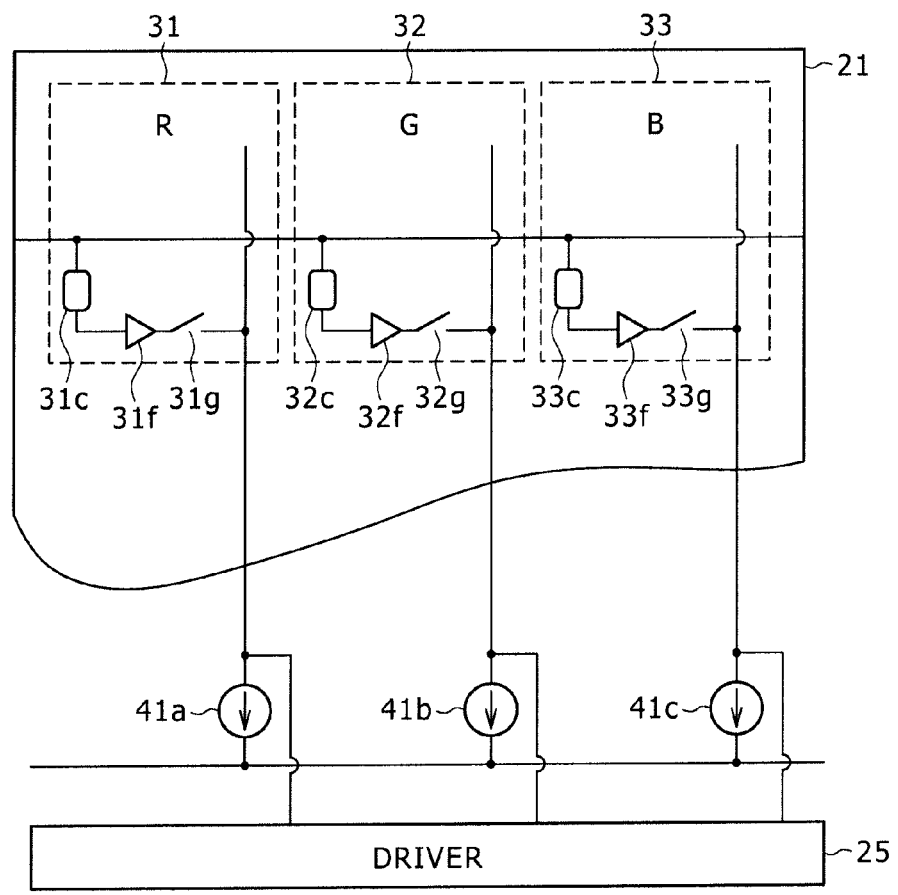
FIG. 4 is a connection diagram showing an example of a configuration for reading from pixels according to the first embodiment of the present invention.

FIG. 4 is a diagram showing a constitution in which signals read from light receiving sensors are supplied to the sensor driver 25. FIG. 4 shows three pixels 31, 32, and 33 for red (R), green (G), and blue (B) which pixels are arranged in proximity to each other. Charges accumulated by capacitors connected to the light receiving sensors 31$c$, 32$c$, and 33$c$ of the respective pixels are amplified by respective buffer amplifiers 31$f$, 32$f$, and 33$f$, and then supplied to the driver 25 via signal outputting electrodes in timing in which reading switches 31$g$, 32$g$, and 33$g$ are turned on. Constant-current sources 41$a$, 41$b$, and 41$c$ are connected to the respective signal outputting electrodes, so that the driver 25 can detect signals corresponding to amounts of received light with a high sensitivity.

Figure 5:
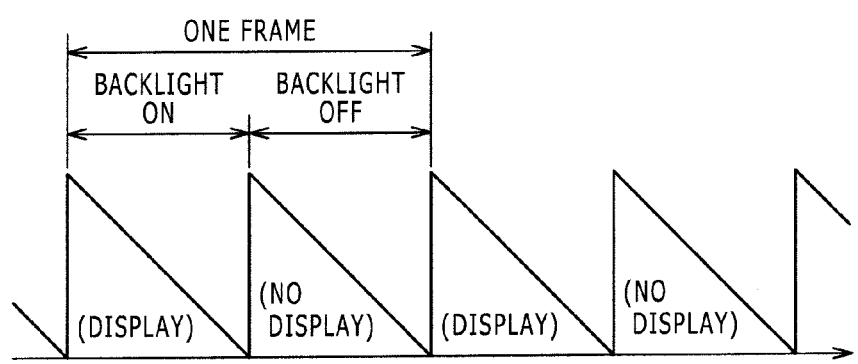
FIG. 5 is a timing chart showing an example of timing of turning on and off a backlight according to the first embodiment of the present invention.

FIG. 5 is a diagram showing display and light reception of the I/O display panel 20 in the present example. As shown in FIG. 5, supposing that an image (a moving image or a still image) is displayed in a frame period of 1/60 seconds for one frame, for example, each frame period is halved, and in the first half period (a period of 1/120 seconds), the backlight 15 is turned on and a display signal is written to each display element to display an image for that frame period. In the second half period of each frame period, the backlight 15 is turned off, and display is not made.

As for the reading of a signal resulting from light reception by a light receiving element, in each frame period, one reading process is performed in the first half period in which the backlight is turned on, and one reading process is also performed in the second half period in which the backlight is turned off. However, while image signal display needs to be made for each frame in a frame period, the reading of light reception signals does not necessarily need to be performed in one frame period and may be performed in a somewhat longer period.

A process performed after light reception signals are thus read will next be described with reference to a flowchart of FIG. 6. As already described with reference to FIG. 5, in the present example, two light reception signals are read in one frame period. Specifically, a signal is read in a state of self-emitted light (backlight light) being on, and a signal is also read in a state of the self-emitted light (backlight light) being off. A difference between the two read signals is obtained. As data of this difference, data of a difference measured in a state in which there is no extraneous light and there is no surface reflector (that is, there is nothing in contact with or adjacent to the surface) is stored and retained as an initial value in the frame memory 13$b$ (FIG. 1) in advance.

Figure 6:
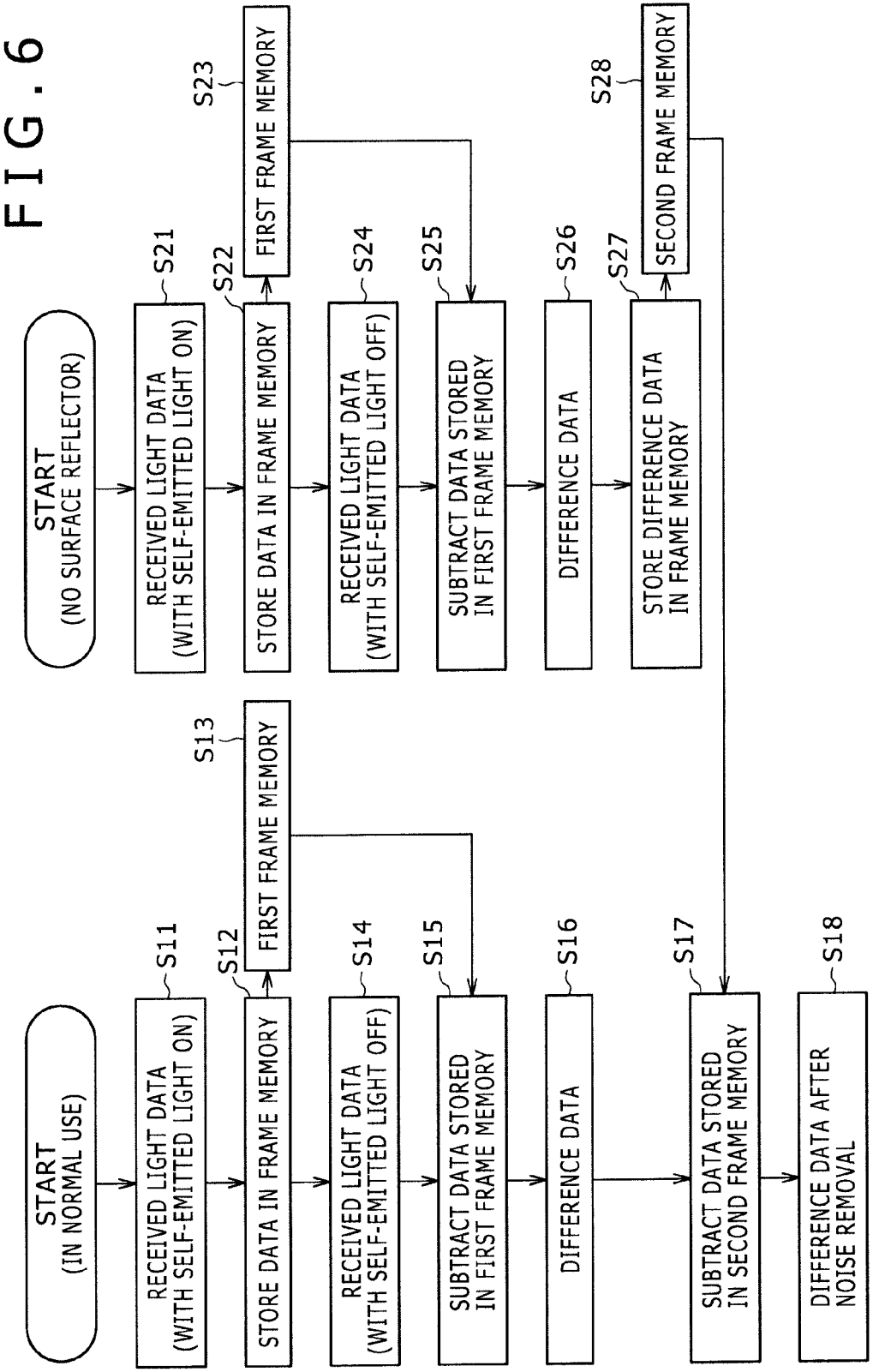
FIG. 6 is a flowchart of principles of a process for determining a contact or proximity position according to the first embodiment of the present invention.
Figure 7:
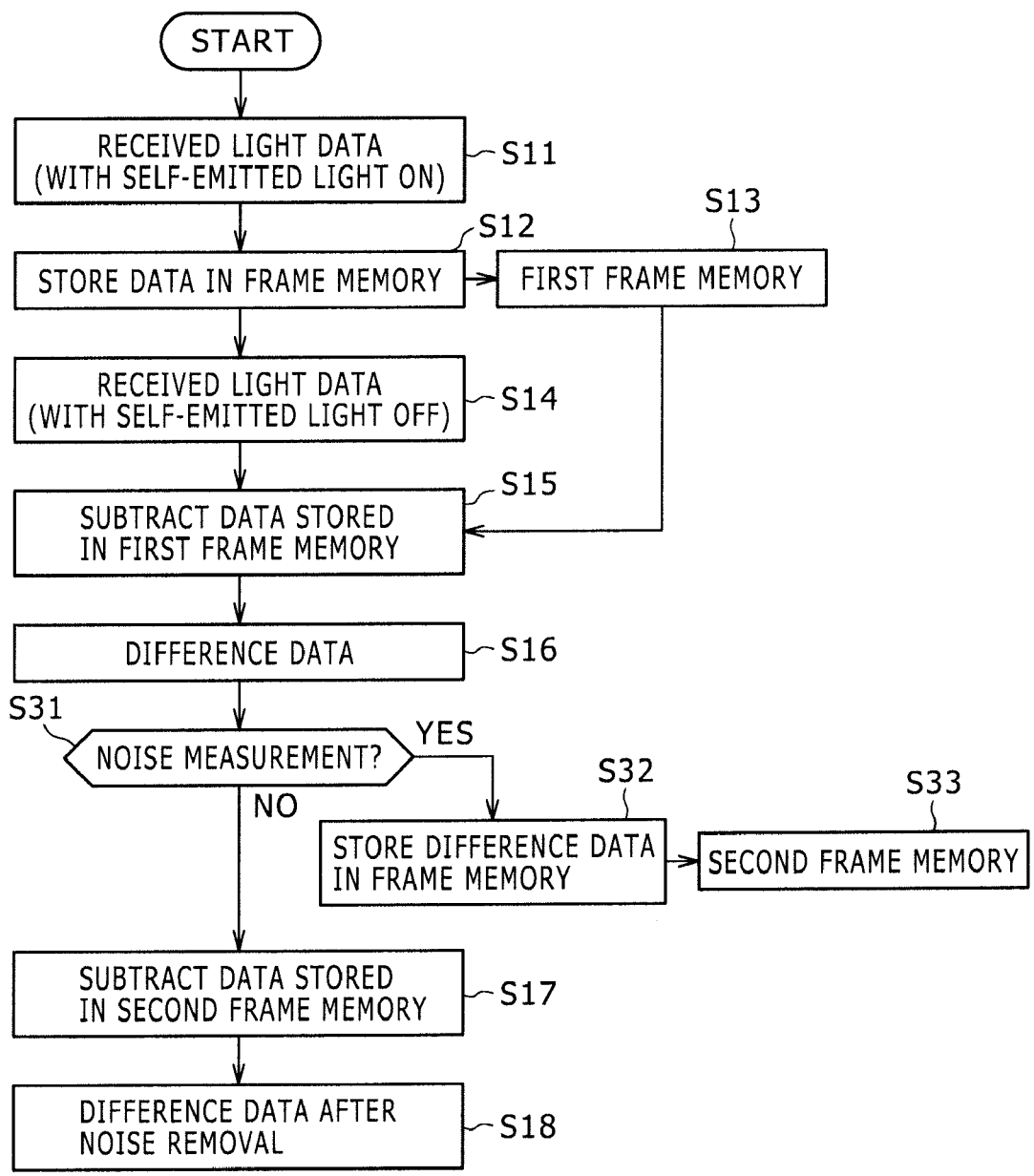
FIG. 7 is a flowchart of an example of a process for determining a contact or proximity position according to the first embodiment of the present invention.

In the flowchart of FIG. 6, a process from step S21 to step S28 on a right side of the flowchart of FIG. 6 is a process for storing the initial value in the frame memory 13$b$, and a process from step S11 to step S18 on a left side of the flowchart of FIG. 6 is a process for detecting contact or proximity using the initial value stored in the frame memory 13$b$ and a measured value at a time in question. The process for storing the initial value in the frame memory 13$b$ is performed before shipment after the display device is manufactured in a factory, for example. Alternatively, the initial value may be updated at any time by a user operation or the like.

Description will first be made of the process for storing an initial value in the frame memory 13b. Data is read in a state of self-emitted light (backlight light) being on with nothing in contact with or adjacent to the display surface in an environment in which no extraneous light enters the display surface from the surroundings of the display device (step S21). The data read at this time is stored in the frame memory 13a (step S22). The stored data is retained in the frame memory 13a (step S23). Then, data is also read in a state of the self-emitted light (backlight light) being off (step S24). The data stored in the frame memory 13a is subtracted from the data read at this time (step S25). A difference between the data in the state of the self-emitted light being on and the data in the state of the self-emitted light being off is thereby obtained (step S26). Thus obtained difference data for one screen is stored in the frame memory 13b (step S27). The stored value is retained as an initial value for measurement until the stored value is updated (step S28). Incidentally, the data retained by the frame memory 13a is used in the process of the calculation, and may therefore be erased after the process is ended.

Then, when measurement is performed to actually detect contact or proximity, data is read in a state of the self-emitted light (backlight light) being on (step S11). The data read at this time is stored in the frame memory 13a (step S12). The stored data is retained in the frame memory 13a (step S13). Then, data is also read in a state of the self-emitted light (backlight light) being off (step S14). The data stored in the frame memory 13a is subtracted from the data read at this time (step S15). A difference between the data in the state of the self-emitted light being on and the data in the state of the self-emitted light being off is thereby obtained (step S16).

After difference data is obtained in step S16, the initial value for measurement stored in the frame memory 13b in step S28 is subtracted from the difference data (step S17). Data resulting from the subtraction is obtained as difference data after noise removal (step S18).

Detected difference data is sent as a difference image in a unit of one frame to the image processing unit 14. The image processing unit 14 binarizes the supplied difference image into a value equal to or higher than a predetermined level and a value lower than the predetermined level in a pixel unit. Further, the image processing unit 14 performs an arithmetic process for determining the center of gravity of an area binarized and detected as an area having values equal to or higher than the predetermined level. The image processing unit 14 sends the coordinate position of the determined center of gravity to the application program executing unit 11. The application program executing unit 11 identifies the supplied coordinate position of the center of gravity as central position of a contacting or adjacent object.

In the process represented in FIG. 6, the noise measurement process and the actual contact detection process are represented as different processes. However, since the two processes are actually similar to each other, the two processes can share a common process as shown in a flowchart of FIG. 7.

Specifically, data is read in a state of self-emitted light (backlight light) being on (step S11). The data read at this time is stored in the frame memory 13a (step S12). The stored data is retained in the frame memory 13a (step S13). Then, data is also read in a state of the self-emitted light (backlight light) being off (step S14). The data stored in the frame memory 13a is subtracted from the data read at this time (step S15). A difference between the data in the state of the self-emitted light being on and the data in the state of the self-emitted light being off is thereby obtained (step S16).

After difference data is obtained in step S16, whether the process up to step S16 is a process for obtaining an initial value for noise measurement or a process for actually detecting contact or proximity is determined (step S31). When the process up to step S16 is the process for obtaining an initial value for noise measurement, the difference data is stored in the frame memory 13b (step S32). The frame memory 13b retains the value as an initial value corresponding to noise (step S33).

When it is determined in step S31 that the process up to step S16 is a process for actually detecting contact or proximity, a value stored in the frame memory 13b is subtracted from measurement data at that time (step S17). A resulting subtraction value is handled as difference data after noise removal (step S18).

By thus subtracting the noise (initial value) measured in advance from the measured value, it is possible to obtain a measured value free from the noise dependent on the constitution of the display device (especially the constitution of the backlight), and thus detect a contact position or a proximity position well with high accuracy.

Figure 8:
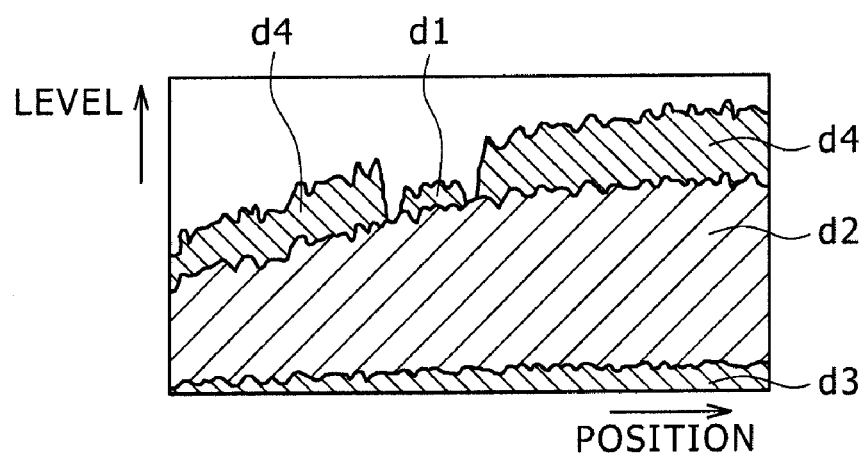
FIG. 8 is a diagram of assistance in explaining an example of received light data at a time of self-emitted light being on according to the first embodiment of the present invention.

The fact that noise can be removed favorably by the process in the present example will be described with reference to examples of measurement data in FIGS. 8 to 11. FIG. 8 is a diagram showing an example of data for one horizontal line when received light data is read in a state of self-emitted light being on in the display device in the present example. In the example of FIG. 8, a signal component d1 resulting from a reflection from an object (reflector) in contact with the display surface is a signal desired to be detected. In actuality, however, a signal component d2 resulting from a backlight internal reflection, a signal component d3 resulting from pixel variations, and a signal component d4 resulting from extraneous light noise are added. The signal component d2 resulting from the backlight internal reflection includes variations in sensitivity. The signal component d3 resulting from pixel variations is a so-called DC noise as base noise added when detection is performed in any state.

While the signal component d4 resulting from the extraneous light noise does not have the signal component d1 to be detected superimposed thereon, the signal component d2 resulting from the backlight internal reflection and the signal component d3 resulting from the pixel variations have the signal component d1 to be detected superimposed thereon. The signal component d1 to be detected is extracted by performing a process represented in a flowchart of FIG. 6 or FIG. 7 as described below.

Figure 9:
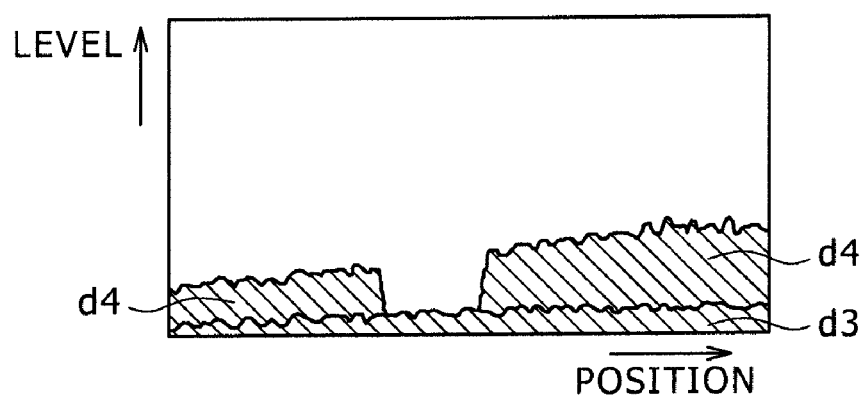
FIG. 9 is a diagram of assistance in explaining an example of received light data at a time of the self-emitted light being off according to the first embodiment of the present invention.

FIG. 9 shows an example of received light data at a time of the self-emitted light being off (that is, at a time of the backlight being off). As shown in this example, the signal component d3 resulting from the pixel variations and the extraneous light noise d4 are detected at the time of the self-emitted light being off. At least the signal components d3 and d4 can be removed by subtracting the received light data at the time of the self-emitted light being off which data is shown in FIG. 9 from the received light data at the time of the self-emitted light being on which data is shown in FIG. 8. The subtraction process using the first frame memory 13a corresponds to this.

In the present example, a measurement initial value is stored in advance in the second frame memory 13b, and the initial value is subtracted. This initial value is generated from received light data shown in FIG. 10A and received light data shown in FIG. 10B. The received light data shown in FIG. 10A is obtained with the backlight on in a state of nothing being in contact with the display surface (there being no reflector in contact with the display surface) in an environment free from extraneous light, and the received light data shown in FIG. 10B is further obtained with the backlight off in this state.

Figure 10A:
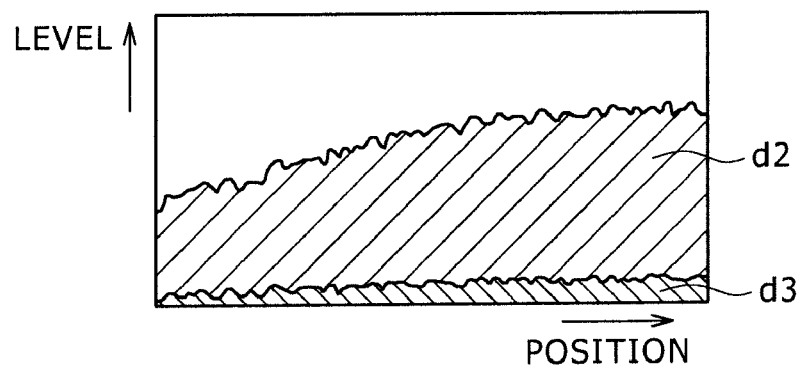
FIGS. 10A and 10B are diagrams of assistance in explaining an example of received light data at a time of the self-emitted light being on and an example of received light data at a time of the self-emitted light being off without extraneous light according to the first embodiment of the present invention.
Figure 10B:
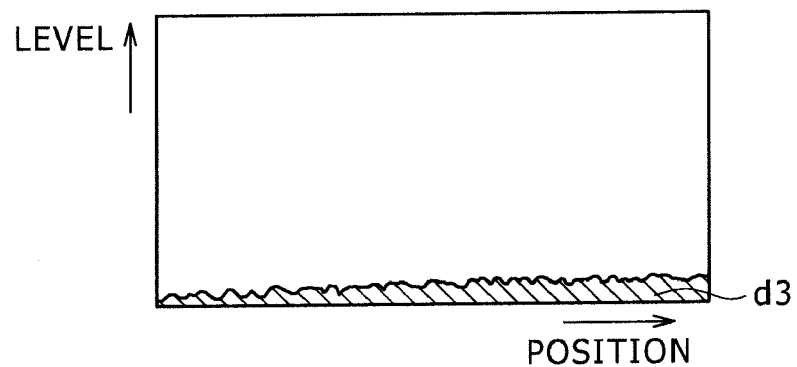

As the received light data at the time of the backlight being on which data is shown in FIG. 10A, the signal component d2 resulting from the backlight internal reflection and the base noise d3 are detected. As the received light data at the time of the backlight being off which data is shown in FIG. 10B, the base noise d3 is detected. In the present example, a difference between the detection data shown in FIG. 10A and the detection data shown in FIG. 10B is stored in the second frame memory 13b. Hence, the initial value stored in the second frame memory 13b is a value corresponding to the signal component d2 resulting from the backlight internal reflection.

Figure 11:
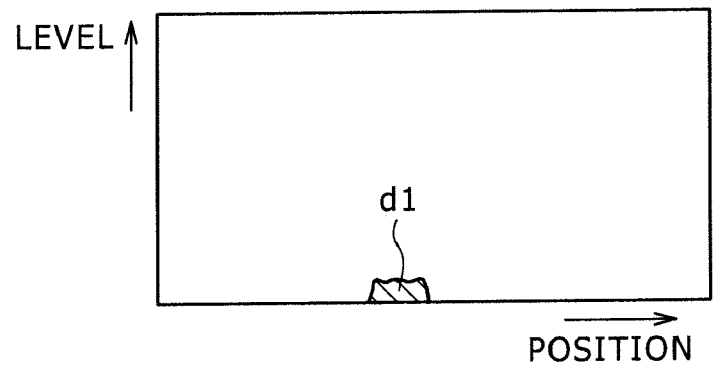
FIG. 11 is a diagram of assistance in explaining an example of received light data after noise removal according to the first embodiment of the present invention.

Thus, by subtracting the initial value stored in the second frame memory 13b (that is, the signal component d2 resulting from the backlight internal reflection) from the difference between the detection data of FIG. 8 and the detection data of FIG. 9, it is possible to ultimately extract the signal component d1 to be detected as shown in FIG. 11. Since the signal component d1 corresponding to contact or proximity can be thus extracted, contact with or proximity to the display surface of the display device can be detected favorably with high accuracy using the extracted signal.

Incidentally, while the stored data in the second frame memory 13b which data is used for such noise removal is stored at a time of manufacturing the display device in the above-described process, the stored data may be updated at any time during actual use of the display device, for example. Specifically, the stored data may be updated by performing a process of remeasuring the data stored in the frame memory 13b when there is a certain user operation. While it is ideal if the data (initial value) first stored in the second frame memory 13b at the time of manufacturing the display device or the like is an individual value obtained by performing measurement for each display device, a representative value may be prepared in advance for each model, and the prepared value may be stored as an initial value for the same model.

In the above-described example, the data stored in the second frame memory 13b is obtained from the difference between the received light signal in the case of the self-emitted light being on which signal is obtained by measurement with no extraneous light and the received light signal in the case of the self-emitted light being off which signal is obtained by measurement with no extraneous light. However, in principle, measurement may be performed with extraneous light. That is, when the brightness of the extraneous light (illuminating light) is substantially uniform, a similar initial value can be obtained because an initial value free from the component resulting from the extraneous light can be obtained by determining the difference between the measurement signal in the case of the self-emitted light being on and the measurement signal in the case of the self-emitted light being off. However, it is desirable that the initial value be obtained from a value measured without extraneous light if possible because the extraneous light component can be varied between the two measurements.

A second embodiment of the present invention will next be described with reference to FIGS. 12 to 14E. While the foregoing first embodiment is an example in which the present invention is applied to a liquid crystal display, the present embodiment is an example in which the present invention is applied to an organic EL display. A liquid crystal display needs a backlight as light emitting means separately from display pixels. In the case of an organic EL display, however, elements forming pixels emit light, and therefore a part of a processing constitution needs to be changed from that of the first embodiment. In the present embodiment, description will focus on this point. The processing of a detected received light signal is the same as in the first embodiment, and therefore description thereof will be omitted.

Figure 12:
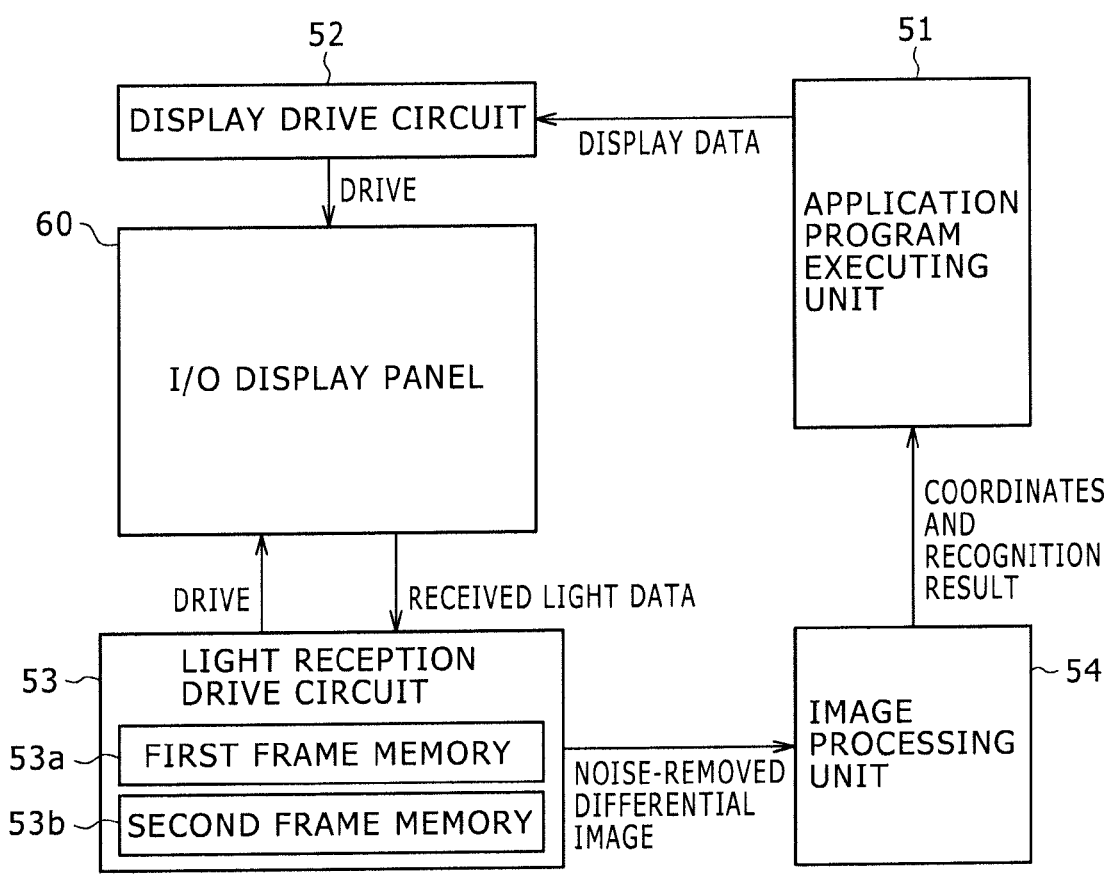
FIG. 12 is a block diagram showing an example of configuration of a display device according to a second embodiment of the present invention.

FIG. 12 is a block diagram showing an example of configuration of a display device according to the present embodiment. An application program executing unit 51 performs a process for displaying an image corresponding to an application being executed by the application program executing unit 51. In addition, the application program executing unit 51 detects a contact with a display panel, and performs a process corresponding to a contacted display part, for example. An instruction to display an image is supplied from the application program executing unit 51 to a display drive circuit 52 to perform driving for displaying the image on an I/O display panel 60.

The I/O display panel 60 is formed as an organic EL display. The I/O display panel 60 is a display having a plurality of pixels (display elements) formed in the form of a matrix in a display area (sensor area). The display elements also function as light receiving elements, and a light emitting period and a light receiving period are set by time division. A signal charge accumulated in correspondence with an amount of light received in the light receiving period is read by driving from a light reception drive circuit 53. The light reception drive circuit 53 has a first frame memory 53a and a second frame memory 53b therewithin for use in a determination process (difference detecting process) necessary at a time of reading a light reception signal. The second frame memory 53b is a memory storing a measurement initial value as described in the first embodiment at a time of shipment from a factory, for example.

The light reception signal (differential image signal) read and determined by the light reception drive circuit 53 is sent to an image processing unit 54 to determine a contact state or the like as an image and, as occasion arises, determine a coordinate position of a contact center or the like. A result of the determination (coordinate data, a recognition result and the like) is sent to the application program executing unit 51. The application program executing unit 51 performs a process according to an application being executed. For example, the application program executing unit 11 performs a process of displaying a point, an area or the like where contact is detected in a displayed image.

FIG. 13 is a diagram showing a configuration of one pixel. In FIG. 13, a light emitting element 61 in the organic EL display is shown as a light emitting diode. A parasitic capacitance 61a occurs at the light emitting element 61. For image display, display data is supplied from a display data signal line 62 to the light emitting element 61 via a switch SW1. Hence, a display period (light emitting period) is set by a period during which the switch SW1 is on.

During a period which the light emission of the light emitting element 61 is stopped, a charge is accumulated in the parasitic capacitance 61a occurring at the light emitting element 61 according to an amount of light incident on a surface of the display panel. The accumulated charge is output to a reception data signal line 64 when a switch SW2 is turned on. Incidentally, at a time of a start of a light receiving period, a switch SW3 for reset needs to be turned on for a moment to discharge a charge accumulated in the parasitic capacitance 61a during light emission. The turning on of the switch SW2 is controlled by a signal obtained in a reading line selecting line 63.

FIGS. 14A, 14B, 14C, 14D, and 14E show an example of detecting contact with or proximity to such an organic EL display type I/O display panel 60 while displaying an image or the like on the I/O display panel 60.

FIG. 14A shows a state of the I/O display panel 60. In this figure, the surface of the I/O display panel 60 is touched with a finger f. In the state shown in FIG. 14A, a light emitting area 60a is a plurality of specific horizontal lines within one screen. While light is not emitted in the light emitting area 60a, the light emitting area 60a is changed within one field period, so that a person viewing the screen can see the display of the entire screen due to an afterimage effect. FIG. 14A shows the horizontal lines of the light emitting area 60a being changed from a top to a bottom.

In this state, as for reading of a received light signal, two readings, that is, a reading of a horizontal line 60b on an upper side adjacent to the light emitting area 60a and a reading of a horizontal line 60c at a certain distance from the horizontal line 60b are performed in one field period. The read lines 60b and 60c are also changed in order in such a manner as to be interlocked with the changing of the light emitting area 60a.

By performing such reading, the reading of the horizontal line 60b adjacent to the light emitting area 60a is a reading that can detect reflection of light from the light emitting area 60a, thus providing read data at a time of self-emitted light being on, as shown in FIG. 14B. The reading of the horizontal line 60c distant from the light emitting area 60a is a reading free from effects of light emission, thus providing read data at a time of the self-emitted light being off, as shown in FIG. 14C. Hence, a difference between the two pieces of read data is detected as shown in FIG. 14D, and thereby a difference between the received light data at the time of the self-emitted light being on and the received light data at the time of the self-emitted light being off is detected. The data of an initial value measured in advance without extraneous light and stored in the frame memory 53b is subtracted from image data on that difference, whereby noise-removed difference data is obtained as shown in FIG. 14E. As a concrete example of the process of obtaining the noise-removed difference data from the received light data, the process represented in the flowchart of FIG. 6 or FIG. 7 described in the foregoing first embodiment can be applied. Thus, with the constitution of the present example, as in the foregoing first embodiment, it is possible to remove effects of extraneous light, eliminate degradation in sensitivity due to nonuniformity of characteristics of elements forming pixels, and remove noise of the constitution of a light source itself. Therefore contact or proximity can be detected excellently.

Thus, the present invention is applicable to a case where display elements forming pixels are light emitting elements as in an organic EL display. The present invention is therefore applicable to any of cases where light emitting means separate from a display panel is necessary as in a liquid crystal display and cases where a display panel itself emits light. While in the foregoing embodiments, description has been made by taking a liquid crystal display and an organic EL display as examples of the respective display panels, the present invention is applicable to displays having other constitutions as long as light receiving elements can be incorporated into the displays.

It should be understood by those skilled in the art that various modifications, combinations, sub-combinations and alterations may occur depending on designs and other factors insofar as they are within the scope of the appended claims or the equivalents thereof.

What is claimed is:

1. A display device for displaying an image and receiving light, said display device comprising:
    a plurality of display elements for displaying the image on a display surface of said display device;
    a plurality of light receiving elements for receiving detection light emitted from the display surface and incident on the display surface; and
    a detecting unit for detecting a state of contact with or proximity to the display surface by detecting an amount of detection light received by said light receiving elements when said display elements emit light and detecting an amount of detection light received by said light receiving elements when said display elements do not emit light, and subtracting an initial value from a difference between the two detected amounts of received light, said initial value being a difference between two amounts of light received by said light receiving elements when said detection light is emitted and when said detection light is not emitted in a state of nothing being in contact with or in proximity to said display surface.

2. The display device as claimed in claim 1, further comprising
    a backlight for illuminating said display surface from a back, said backlight being separate from said display elements,
    wherein two light receptions for obtaining said initial value and two light receptions for obtaining a detection value are light reception in a state of the backlight illuminating and light reception in a state of the backlight not illuminating.

3. The display device as claimed in claim 1, wherein a value obtained by subtracting said initial value is binarized, and a position of contact with or proximity to the display surface is detected.

4. The display device as claimed in claim 1, wherein the initial value is updated on a basis of a predetermined operation.

5. The display device as claimed in claim 1, wherein said display elements and said light receiving elements are identical elements;
    said display elements are used as light receiving elements in a period when light emission display by said display elements is not made; and
    light reception when light emission by said display elements is performed is light reception immediately after the light emission by said display elements is stopped, and light reception when said light emission is not performed is light reception after passage of a predetermined time after the light emission is stopped.

6. A display method for displaying an image on a display surface and receiving light, said display method comprising the steps of:
    displaying the image on the display surface;
    performing light reception for receiving detection light emitted from the display surface and incident on the display surface, and as the light reception, performing two light receptions in a state in which said light emission for display in said step of displaying is performed and a state in which said light emission for display is not performed; and
    detecting a difference value between amounts of detection light in said two light receptions to detect a state of contact with or proximity to the display surface, and detecting a state of contact with or proximity to the display surface by subtracting an initial value, said initial value being a difference between two amounts of light received by said light receiving elements when said detection light is emitted and when said detection light is not emitted in a state of nothing being in contact with or in proximity to said display surface.

* * * * *